(12) United States Patent
Muralidhar

(10) Patent No.: US 12,348,514 B2
(45) Date of Patent: Jul. 1, 2025

(54) SYSTEMS AND METHODS FOR ENFORCING ACCESS REQUIREMENTS TO SERVICES IN A DISTRIBUTED SERVICES SYSTEM

(71) Applicant: Stripe, Inc., South San Francisco, CA (US)

(72) Inventor: Suhas Hoskote Muralidhar, Bothell, WA (US)

(73) Assignee: STRIPE, INC., South San Francisco, CA (US)

( * ) Notice: Subject to any disclaimer, the term of this patent is extended or adjusted under 35 U.S.C. 154(b) by 271 days.

(21) Appl. No.: 18/137,886

(22) Filed: Apr. 21, 2023

(65) Prior Publication Data

US 2024/0356919 A1 Oct. 24, 2024

(51) Int. Cl.
*H04L 9/40* (2022.01)
(52) U.S. Cl.
CPC .................. *H04L 63/0884* (2013.01)
(58) Field of Classification Search
CPC .................................................. H04L 63/0884
See application file for complete search history.

(56) References Cited

U.S. PATENT DOCUMENTS

2007/0073889 A1\* 3/2007 Morris .................... H04L 67/54
709/229
2024/0129306 A1\* 4/2024 Jalal ...................... H04L 63/102

\* cited by examiner

*Primary Examiner* — Huan V Doan
(74) *Attorney, Agent, or Firm* — Womble Bond Dickinson (US) LLP

(57) ABSTRACT

Methods and apparatus for authenticating a user by a service provider system are described. The method can include receiving, from a service of the service provider system, a user data captured at an initiation of an onboarding process for a user seeking access to the service. The method may also include retrieving an access configuration associated with the service, the access configuration defining one or more user data access requirements to enable the user to access the service. The method may then include determining whether the one or more user data access requirements of the access configuration are satisfied by the user data, and in response to determining that one or more user data access requirements are satisfied, enabling the user to access the service of the server provider system. Furthermore, the method can include transmitting, to the service, a notification indicating that the user has satisfied the access requirements to enable the user to continue the onboarding process for the user to access the service.

17 Claims, 6 Drawing Sheets

SYSTEMS AND METHODS FOR ENFORCING ACCESS REQUIREMENTS TO SERVICES IN A DISTRIBUTED SERVICES SYSTEM

BACKGROUND

Organizations are increasingly using distributed computing techniques to provide their products and services to end users. Such distributed computing techniques often involve the distribution of products and/or services performed by different physical computing resources that communicate with one another via a computing network. The distributed physical computing resources utilize network-based communication to exchange messaging that support each physical machine's functions and/or the functions of other machines within the distributed computing environment to complete an overall operation through a collection of distributed tasks. Thus, the collection of distributed physical computing resources cooperate to provide the organization's products and services to their end users.

While the distribution resources as distinct services processed by distinct systems is helpful in developing, maintaining, and then providing multiple services by an organization to end users, certain problems may arise. In particular, one such problem arises when seeking to control access to specific services and/or products of a distributed service system. For example, devices may use the computing network to access the service(s) of the organization from any location in the world. However, due to geographic restrictions (e.g., country, regional within a country, state, or other defined areas), legal restrictions (e.g., statutory), user-based restrictions (e.g., user role within an organization), or other restrictions, specific users should not be given access to one or more requested service(s) due to the corresponding restriction(s). Such restrictions may be based on legal requirements, as well as additional considerations such as controlling fraudulent activity. As another example, a first geographic region may be associated with a country to which services are not allowed to be provided, whereas a second geographic region may be associated with an unacceptable level of network based fraudulent activity. However, user mobility creates a problem as users of the first and/or second example geographic regions may reside at any location and seek to access services of the organization that may be associated with various restrictions. Therefore, how to enforce restrictions on users seeking access to services of an organization in the networked computing environment is a problem that needs to be addressed.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
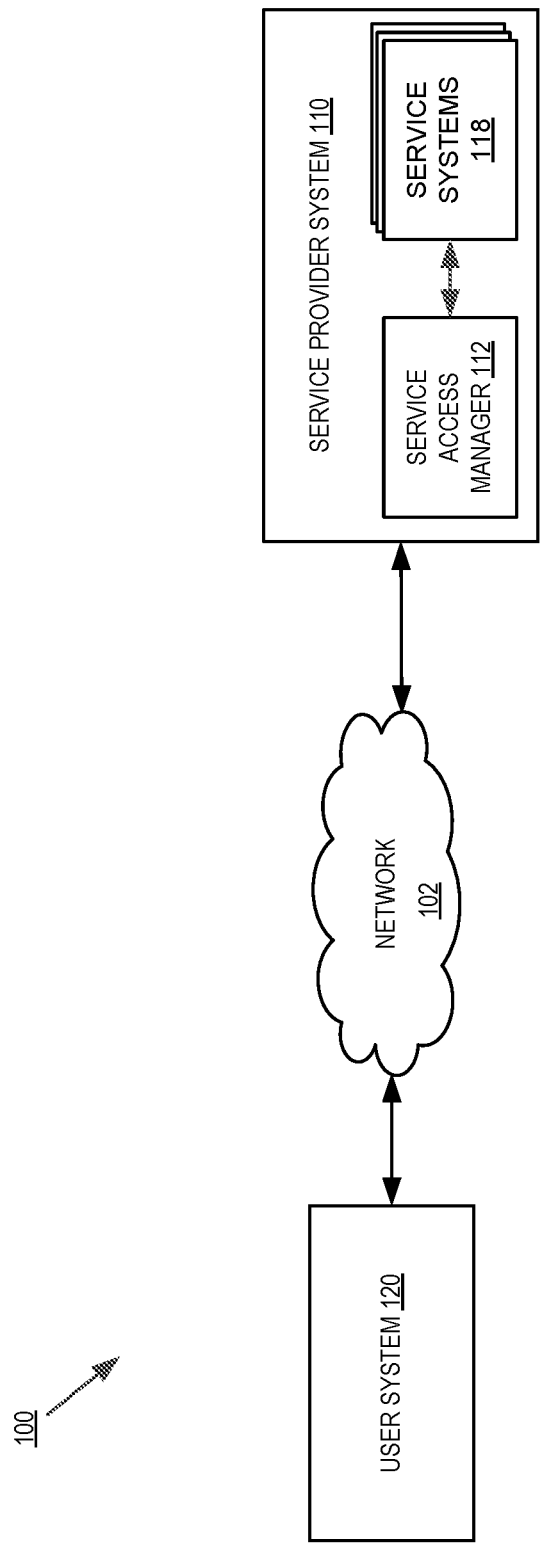
FIG. 1 is a block diagram of an exemplary system architecture for implementing access requirements for users seeking to access services of a service provider system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "retrieving", "determining", "enabling", "transmitting", "accessing", "scanning", "denying", "initiating", "storing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for implementing access requirements for users seeking to access services of a service provider system 110. In one embodiment, the system 100 includes service provider system 110 and one or more user systems, such as user system 120. In one embodiment, one or more of the user systems may be mobile computing devices, such as a smartphone, tablet computer, gaming devices, medical devices, smartwatch, etc., as well as computer systems, such as a desktop computer system, laptop computer system, server computer systems, etc. used by end users to access the services or products provided by distributed service provider system 110. In the discussion herein, services and products are used interchangeable to refer to the functions provided to users by the service provider system 110. The distributed service provider system 110 may also be one or more computing devices, such as one or more server computer systems, desktop computer systems, etc.

The service provider system 110 and user system 120 may be coupled to a network 102 and communicate with one another using any of the standard protocols for the exchange of information, including secure communication protocols. In one embodiment, one or more of the service provider system 110 and user system 120 may run on one Local Area Network (LAN) and may be incorporated into the same physical or logical system, or different physical or logical systems. Alternatively, the service provider system 110 and user system 120 may reside on different LANs, wide area networks, cellular telephone networks, etc. that may be coupled together via the Internet but separated by firewalls, routers, and/or other network devices. In one embodiment, service provider system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, service provider system 110 provides financial processing products to one or more users, such as merchants, agents of the merchants, end users, etc. For example, service provider system 110 may manage merchant accounts held at the service provider system 110, run financial transactions initiated at end user system performed on behalf of a merchant systems, clear transactions, performing payouts to merchants and/or merchants' agents, manage merchant and/or agent accounts held at the distributed service provider system 110, as well as other services typically associated with commerce platforms systems such as, for example, STRIPE™. However, service provider system 110 is not limited to financial processing systems, as any distributed computing system that distributes service processing among different physical machines and seeks to ensure access and deletion of user data, may use the techniques discussed herein. For example, distributed computing environments that provide media distribution products, productivity products, social networking products, gaming products, customer relationship management products, communication products, medical products, etc. may utilize the techniques discussed herein.

In an embodiment, service provider system 110 is a distributed computing environment that provides products to end users, such user system 120. Although one user system 120 is shown, any number of user systems may seek to access and user the services of service provider system 110, such to enforced access requirements as discussed herein. Each end user system may interact directly with the products or services of the service provider system 110, or through a merchant system (not shown) that employs the products or services of the service provider system 110 (e.g., application programming interface(s) (APIs), software libraries, products, etc.) to interact with end users. Products and services of the service provider system 110 can be considered to be anything from systems that support end users (e.g., data storage, content management, payment processing, etc.).

In embodiments, service provider system 110, in providing their product(s) to user system 120, may deploy the products as distinct services, for example having their own processing resources, executing in its own processing environment, etc. For example, for a service provider system 110 that provides subscription service management user systems, the service may include setting up new subscriptions, managing subscription parameters, cancelling existing subscriptions, and initiating subscription billing. Continuing the example, a second, distinct service may include an invoicing service that generates, distributes, and tracks invoices for subscriptions. Furthermore, yet another service may be a payments service that enables a user to store payment information at the service provider system for later use, an includes services to establish an account, select a payment method, obscure the payment method to a recipient of the payment, etc.

Any number of different services may be provided to the users of service provider system 110, such as a user of user system 120. However, in embodiments, each service is associated with its own access requirements that control which users are able to access the services. In embodiments, a user system 120 seeking to access a service provided by a service system 118 will initially seek to sign up for that service. The corresponding service system 118 therefore provides an onboarding process to facilitate this signing up of a user to a service, which can include collecting user information (e.g., name, date of birth, address information, etc.), payment information (e.g., banking information, credit card information, etc.), user device information (e.g., an internet protocol (IP) address, device operating system information, software version information, etc.), as well other user information. Not all the information indicated above is collected during onboarding, as various subsets of such information are collected by different services having different user data collection requirements. Furthermore, in embodiments, each service provided by a service system 118 may have its own user data access requirements. For example, a first service may have no restrictions to user data access, a second service may have a restriction that prevents access to users from specific defined geographic areas, a third service may have a different restriction that prevents access to users having specific characteristics such as payment type, bank, role within their organization, etc., a fourth service may have different levels of service each having their own unique restrictions, etc. Furthermore, these restrictions may change dynamically over time as restriction requirements change (e.g., changes in legal requirements, product deployments, service offerings, or a combination of such factors). Thus, requiring each service system 118 to update the restrictions, enforce restrictions, and then implement the restrictions becomes very difficult, as well as inefficient as to the use of processing resources at each of the service systems 118.

In embodiments, a service system 118 therefore interacts with a service access manager 112 during an onboarding process of a user seeking to access the services provided by the service system 118. In an embodiment, service system 118 transmits user data collected at the initiation of the onboarding process. For example, such day may include user supplied data, such as a user supplied name, address, date of birth, etc., captured user data, such as a user IP address, one or more device identifiers, software information, operating system information, etc., or a combination of such user information. Service manager 112 then accesses an access configuration associated with the service. The access configuration is associated with the service and defines one or more user data access requirements that enable user access to the service. Service manager 112 may store any number of access configurations, for example as rows in a table (e.g., a key associated with the service provides access to the row of access requirements/rules), in an XML document, as rules in a rules database where each service is associated with a set of rules, where such access configurations are accessible by service manager 112 based on the identity of the requesting service.

Service manager 112 then uses the received user data to determine whether the user data access requirements from the access configuration for the service are satisfied. For example, if a service has a geographic restriction, the service manager 112 will confirm that the user data does not violate the restriction, such as ensuring a user location inferred from an IP address, a user location inferred from banking or payment card information, user location determined from a user supplied address, or a combination of such factors do not violate the access restriction. As another example, if a service has a payment type restriction, service manager 112 will confirm a user supplied payment type is not the payment type specified in the restriction. The service manager 112 may then return a service access approval or denial to the service, which in turn provides the approval or denial to the user system 120. As a result, the service may be enabled to continue the onboarding process or may decline the onboarding of the user to the service.

In some embodiments, service access manager 112 may further determine at least one additional service a user may be enabled to access based on the user data received or collected during the onboarding process. For example, service access manager 112 may use the received and/or collected user data to analyze the access configurations associated with one or more additional services. Such additional services may include different levels of a service to which a user is seeking to be onboarded and/or different services that the user is not seeking to be onboarded to as determined by the service access manager 112. Due to the number of potential service offerings provided by the service provider system 110, in embodiments, service manager 120 accesses a select set of service configurations. The set may be predefined, such as by a user of service provider system, and include a set of related service so that onboarding to any service within the set implies that the user would likely be interested in the other services. The set may also be determined by the service access manager 112, for example, by determining which subsets of services users typically belong to by scanning the service(s) to which users of the service provider system 110 have access to. Furthermore, in embodiments, the determination of these service offerings may be determined asynchronously with the onboarding process (e.g., at a later time), or synchronously with the onboarding process (e.g., in line with the onboarding and/or determination of the access configuration compliance). Thus, service access manager 112 may provide recommendations to user system 120 of alternative services when the user system 120 does not satisfy access requirements for a requested service, as well as when the user system 120 does satisfy access requirement. Then, based on whether the additional service offerings are determined synchronously or asynchronously, a notification may be provided to the user system 120.

In embodiments, the access configurations defining user data access requirements, as discussed herein, may be generated and/or revised in various manners. In an embodiment, an access configuration may be defined by a user of service provider system 110, for example via an access configuration interface. The interface enables the user of service provider system 110 to define new user data access requirements, edit existing data access requirement, remove user data access requirements, etc. The new and/or edited access configuration may then be accessed by service access manager 112 for enforcement based on the new and/or edited requirement. In another embodiment, an access configuration's user data access requirements may be automatically determined, such as by crawling a third party system's databased, web page, etc. to locate and extract user data access requirements from the third party content. For example, a government regulation web page may be crawled to locate geographic restrictions, such as blocked countries, sanctioned countries, etc., where such geographic restrictions are used to create and/or edit one or more access configurations. In either embodiment, or a combination of embodiments, the access configurations are dynamically integrated with the existing access requirements so that service access manager 112 employs the latest access requirements.

In embodiments, as discussed herein, the defining, updating, and enforcing of access configurations to restrict user access to services of the service provider system 110 reduces computational complexity removing the service access management functions from each service system 118, and instead implementing the functions in a centralized source at service access manager 112. Furthermore, security in access restriction to services is increased as a centralized source of truth is established in the service access manager 112, which avoids lag or inconsistencies in updated applied to each service system 118. Additionally, accuracy in access restrictions can be maintained at a high level as service access manager 112 is configured to make access configurations on various subsets of user data, which may be user supplied, automatically collected from a user, or a combination thereof.

Figure 2:
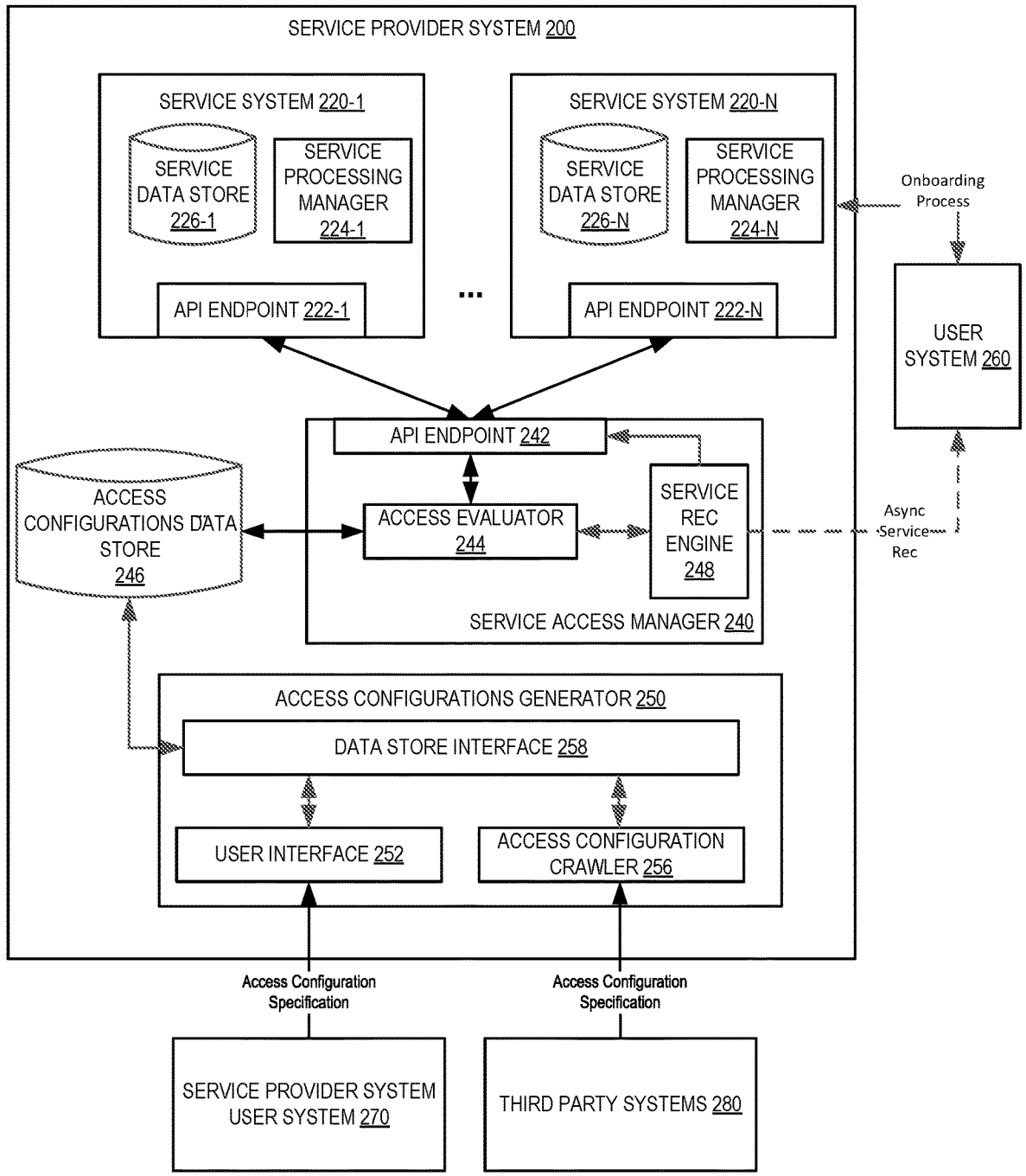
FIG. 2 is a block diagram of one embodiment of a service provider system that enforces access requirements for a service provider system.

FIG. 2 is a block diagram of one embodiment of a service provider system 200 that enforces access requirements for the service provider system.

In the embodiment illustrated in FIG. 2, service provider system 200 includes a service access manager 240, an access configurations generator 250, an access configurations data store 246 accessible to the service access manager 240 and the access configurations generator 250, and a plurality of service systems 220-1 through 220-N. Each of these systems may be distributed among different physical and/or logical computing device(s) of the service provider system 200.

Figure 6:
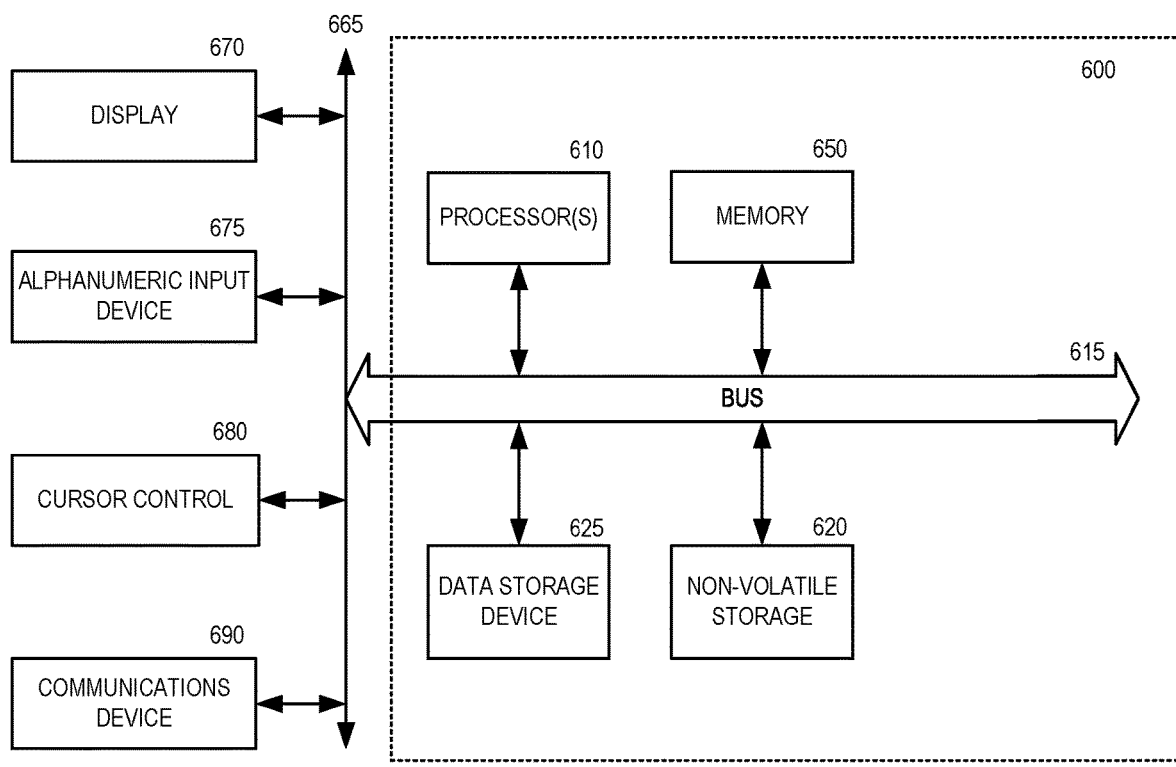
FIG. 6 is one embodiment of a computer system that may be used to support the systems and operations discussed herein.

One such computing device is illustrated in FIG. 6 and described below. Furthermore, each computing device may be executed on separate systems and communicate with one another over one or more communications network(s) (e.g., network 102).

Access configurations generator 250 includes a user interface for receiving access configuration specification(s) from service provider system user system 270. As discussed herein, an access configuration is a set of user data access requirement(s) that are to be associated with a service provided by a service system. The user data access requirement(s) define a set of limits on which users may access a service, such as defined geographic limitations, regional limitations, other defined geographic or regional limitations, user parameter based limitations (e.g., limitations on card type, payment method, role sought for a service such as management role, administrator role, etc.), service based limitations (e.g., maximum number of users, conflicts with other services), legal regulation based limitations (e.g., sanctioned countries, sanctioned regions, sanctioned individuals, or other conditions that restrict providing service(s)), etc. User interface 252 receives the specification of the user data access requirements and the associated service, which are provided to data store interface 258. Data store interface 258 is then responsible for formatting and storing the access requirements in an access configuration within data store 246. For example, where access configurations are maintained in a data table, the service is associated with a key value (e.g., a service identifier) providing an access to a row of the table, in which the user data access requirements conditions defining the access configuration are stored. A similar approach can be used where service identifiers provide access to a rules database, where access configurations are stored in a non-tabular format (e.g., database records, XML documents, etc.). Other approaches to storing access configurations may be used consistent with the discussion hereon. Thus, users, such as developers of a service may use the user interface 250 to update the repository of user data access requirements as changes to such requirements occur. Furthermore, no additional coding of the services is needed.

Access configurations generator 250 further includes an access configuration crawler 256 that is responsible for accessing third party user system 280 to locate and extract user data access requirements for access configuration specification. Access configuration crawler may be configured to access third party web pages, third party document repositories, etc. to analyze text from these sources. Keywords may be defined so that access requirements associated with such keywords can be located, and the conditions defining the access requirements extracted form the third party systems 280 sources. Then, similar to the discussion above, data store interface 258 is then responsible for formatting and storing the access requirements in an access configuration within data store 246. Furthermore, in embodiments, access configuration crawler 256 may be configured to periodically access the third party systems 280 sources (e.g., daily, monthly, quarterly), as well as on demand, to find, locate, and integrate the latest user data access requirements for access configurations in data store 246.

In some embodiments, rules defined by the user of service provider system user interface 270 and/or located by access configuration crawler 256 may be global rules. That is, a user access rule, such as denial of a user residing in geographic region X to all services, may also be defined. In this embodiment, the global rules may be added to each access configuration. However, in other embodiments, such global rules may be added to a global access configuration that is always accessed with a service specific access configuration.

The updating of access configurations enabled by user interface 252 and 256 provides for the dynamic and real-time updating of the access configurations and user data access requirements stored therein. Thus, the service access manager 240 when accessing one or more access configurations beneficially accesses the latest requirements. Thus, the security and accuracy of the applied access configurations and the user data access requirements therein help to improve the security and accuracy of the user data access control discussed herein.

Service access manager 240 is responsible for interacting with each of the service systems 220-1 through 220-N. Because each of service access manger 240 and service systems 220-1 through 220-N are distinct systems of the service provider system 200, service access manger 240 and service systems 220-1 through 220-N interact via API based messaging. In embodiments, each of service access manger 240 and service systems 220-1 through 220-N has an API endpoint (e.g., API endpoint 242 and API endpoints 222-1 through 222-N). Then, service access manger 240 and service systems 220-1 through 220-N use the API endpoints to exchange API based messaging, which exchange user data obtained during onboarding, access configuration determinations, etc.

In embodiments, user system 260 engages in an onboarding process with a service system, such as service system 220-N. Service processing manager 224-N is the logic of the service system that include processes for onboarding a user and deploying the service. Thus, service processing manager 224-N collects a set of user data during the onboarding process, which may be stored in service data store 226-N. The collected data may be, as discussed herein, user supplied data (e.g., username, address, phone number, email address, etc.) and/or captured user data (e.g., user system 260 IP address, an device identifier of user system 260, operating system data of the operating system of user system 260, browser information of the browser user system 260 is using to access service system's 220-N's onboarding process, etc.). A subset of all of the user data, as well as an identifier of the service from which the user data is supplied, is provided from API endpoint 222-N to API endpoint 242 of service access manager 240 in an API based message.

Access evaluator 244 of the service access manager 240 receives the user data and service identifier and retrieves an access configuration, defining user data access requirement(s) that will enable user access to the service of service system 220-N. For example, the service identifier may act as a key to the one or more rules defining the access configuration. After the access configuration is obtained, access evaluator 244 determines whether the user data satisfies the user data access requirements of the access configuration. For example, access evaluator determines whether a user supplied location (e.g., address), an inferred user location (e.g., based on an IP address, bank identity, card type, etc.), or a combination indicates that the user is located in a geographic region for which the service is not available. As another example, the user supplied data may be used to determine if any restriction defined by the access configuration is not satisfied, such as a user providing a payment card type not allowed for a specific service, a user seeking a role not allowed for a service (e.g., user seeking an administration role), as well as other restriction determinations. The results, such as allowing access to the service or denying access to the service, are then returned as an API based message to the service system 220-N.

In embodiments, this process of determining whether a user can access a service occurs at the initiation of the onboarding process managed by service system's 220-N manager 224-N. Thus, in embodiments, a user selecting a link to an onboarding process may trigger the messaging and user access determination discussed above. In this embodiment, a user may not have supplied any data, and the determination is based on the capturable user data (e.g., IP address based location, user system type information, user system software information, as well as other user data that can determine or infer the user's location). As such, the user does not supply data, and for users denied access the service, the service system 220-N does not thereafter collect user data. Furthermore, the user is not granted access to any parts of the service system 220-N until user access can be confirmed. In embodiments, on determined denied access to a service, service processing manager 224-N may delete the obtained and/or received user data from service data store 226-N.

In other embodiments, the process of determining whether a user can access a service occurs at after an initial user data collection (e.g., submission of user supplied data) during the onboarding process managed by service system's 220-N manager 224-N. Although additional user data is collected, a larger source of user information can be used to determine access authorization or denial, determine whether user supplied data is consistent with automatically collected user data, etc. In embodiments, on determined denied access to a service, service processing manager 224-N may again delete the obtained and/or received user data from service data store 226-N.

In embodiments, the user data received by access evaluator 224 may further be used by access evaluator to determine alternative or additional services a user may want to access based on the service access requested by the user. That is, service recommendation engine 248 may establish subsets of services of the service provider system 200. The subsets may be established manually, such as by a user configuring subsets of related services, complimentary services, etc. defined by a user of service provider system 200. The subsets may also be determined automatically, such as by service recommendation engine 248 accessing a user data store (not shown) to determine subsets of services users of the service provider system 200 commonly use. For example, subsets may be generated based on a minimum number of users each having accounts for the services of the subset. Thus, if X number of users each have onboarded to service 1, service 2, ... service M, where X is greater than a threshold value, then the services 1, 2, .... M may be determined by service recommendation engine 248 as being a set of related services.

In embodiments, access evaluator 244 when determining a user's compliance with user data access requirements of a service configuration may further access the related service groupings to determine whether the user is in compliance with any of the related services. The determination uses the user data, accesses the access configurations for each service of the group, and determines whether the user is allowed or denied access to each service. One or more of the services from the group of additional services to which the user is allowed to access based upon the user data and the access configurations, may then form a recommendation. In embodiments, the recommendation may be generated and transmitted to the user system 260 synchronously with the service onboarding process. That is, as the user is completing the onboarding process to service 222-N, the user may be provided with the option to onboard to one or more additional services. In embodiments, where the user is denied access to a service, the recommendation may be generated and transmitted to the user system 260 synchronously with denial of access to the service onboarding process as alternative services that the user may be interested in. In other embodiments, the additional or alternative services may be transmitted to the user system 260 asynchronously after the completion (e.g., authorization of rejection) of the user onboarding to the service 220-N.

Figure 3:
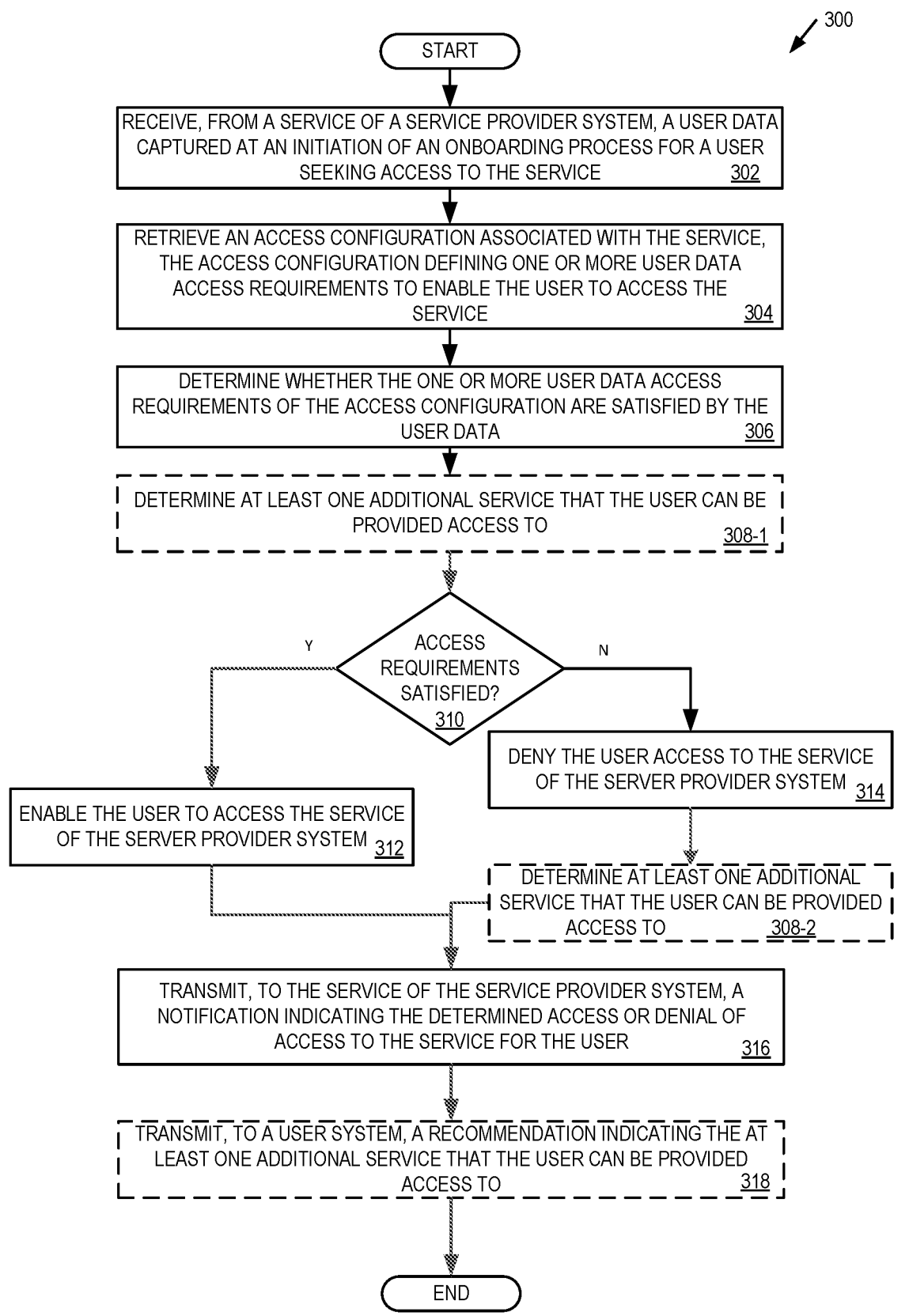
FIG. 3 is one embodiment of a process for a service provider system managing and enforcing access requirements for services of the service provider system.

FIG. 3 is one embodiment of a process 300 for a service provider system managing and enforcing access requirements for services of the service provider system. The process 300 is performed by processing logic that may comprise hardware (circuitry, dedicated logic, etc.), software (such as is run on a general purpose computer system or a dedicated machine), firmware, or a combination. In one embodiment, the process 300 is performed a service provider system (e.g., service provider system 110 or 200).

Referring to FIG. 3, processing logic begins by receiving, from a service of a service provider system, a user data captured at an initiation of an onboarding process for a user seeking access to the service (processing block 302). In embodiments, the captured user data may be automatically or passively captured data, such as data from a user system, including an IP address, an operating system type, an operating system version, a browser type, a browser version, one or more device identifiers, etc. The captured user data may also be data received or supplied from a user, such as username, phone number, address, payment instrument type, banking information, etc. Furthermore, the captured user data may be a combination of user-supplied information and automatically captured user data.

Processing logic then retrieves an access configuration associated with the service, the access configuration defining one or more user data access requirements to enable the user to access the service (processing block 304). In some embodiments, processing logic accesses the access configuration from a data store based on the identity of the service to which the user is seeking access. For example, a service identifier may be a key used to locate and access user data access requirement rules associated with the key. The rules may be defined as records associated with the key, values set for a rule record, or other specification of specific rules to be applied for the access configuration. In embodiments, the access configuration and rule(s) defined by the access configuration may be a tabular data record, an XML document, or other data structure having rules associated with a service and accessible via a key. Furthermore, in some embodiments, one or more global access configurations having user data access requirements may also be accessed.

Processing logic determines whether the one or more user data access requirements of the access configuration are satisfied by the user data (processing block 306). In embodiments, the determination uses the user data to compare against the user data access requirements. For example, if an access configuration defines a geographic limitation for service access, processing logic can determine whether at least one item of user data location satisfies the rule, whether all pieces of user location data satisfy the rule, or whether certain pieces of user data satisfy the rule (e.g., user location data that is particularly probative of a current user's location). Furthermore, the rules may be Boolean (e.g., they either satisfy or do not satisfy a requirement), provide ranges (e.g., a set of values that either satisfy or do not satisfy a requirement), provide a set of requirements for a rule (e.g., A+B or C+D will satisfy rule i).

In some embodiments, as illustrated in dashed line, processing logic optionally determines at least one additional service that the user can be provided access to (processing block 308-1). In embodiments, the at least one additional service can include a different level of the same service (e.g., a user is seeking basic access to a service, but may also want administrative access), a different service (e.g., one from a set of related services, as discussed herein), a limited access to a requested service to which the user does not have sufficient access rights, or other services.

When the access requirements are determined to be satisfied (processing block 310), processing logic enables the user to access the service of the server provider system (processing block 312).

However, when the access requirements are determined not to be satisfied (processing block 310), processing logic denies the user access to the service of the server provider system (processing block 314). In some embodiments, in response to the denial of access to the service, processing logic may optionally determine at least one additional service that the user can be provided access to (processing block 308-2). In addition to the additional services discussed above in processing block 308-1, in processing block 308-2, processing logic may also determine at least one additional service that includes a limited access version of the service. For example, a user may request administration access for a service, but their data is determined not to satisfy the access requirements. However, a limited access version of access, such as regular (non-administration) access may be grantable.

Processing logic transmits, to the service of the service provider system, a notification indicating the determined access or denial of access to the service for the user (processing block 316). This notification may include data, such as reasons for service access denial, additional data collection requirements that would satisfy service access, etc., that can be forwarded by a service to the user seeking access to the service. Processing logic further optionally transmits, to a user system, a recommendation indicating the at least one additional service that the user can be provided access to (processing block 318). In embodiments, these are the services determined in processing blocks 308-1 and/or 308-2. Furthermore, as discussed herein, the notification may be transmitted to the user system synchronously or asynchronously with the onboarding process between the user and the service. The notification, in embodiments, may be a text message, email message, or other form providing data related to the recommendations and/or links that resolve at onboarding processes of the recommended services. In some embodiments, the notification message is generated and transmitted by processing logic for all onboardings, which for example, may generate notifications regardless of acceptance or rejection to a requested service. This these embodiments, additional service notifications would always be transmitted to a user. However, in some embodiments, service recommendation(s) are transmitted when a user fails to gain access to a requested service and/or requested level of a service.

Figure 4A:
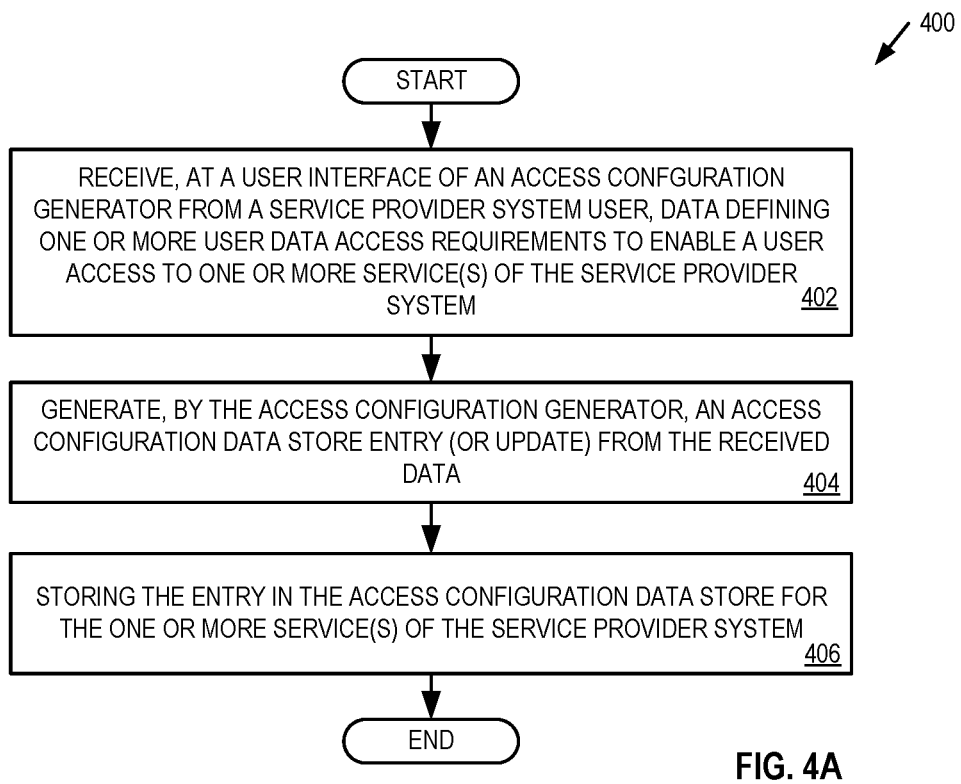
FIG. 4A is one embodiment of a process for creating access requirements for a service of a service provider system.

FIG. 4A is one embodiment of a process 400 for creating access requirements for a service of a service provider system. The process 400 is performed by processing logic that may comprise hardware (circuitry, dedicated logic, etc.), software (such as is run on a general purpose computer system or a dedicated machine), firmware, or a combination. In one embodiment, the process 400 is performed a service provider system (e.g., service provider system 110 or 200).

Referring to FIG. 4A, processing logic begins by receiving, at a user interface of an access configuration generator from a service provider system user, data defining one or more user data access requirements to enable a user access to one or more service(s) of the service provider system (processing block 402). In embodiments, the data defining one or more user data access requirements are user defined for creating an access configuration. Specification of such rules can be by service owners (e.g., developers associated with a service where the rule applies to single service), or by global users (e.g., a user, such as an organization officer, lawyer, etc., defining a rule applicable to two or more services, such as a global rule). Furthermore, in embodiments, the access requirements may be defined for a new access configuration, or may edit or otherwise alter an existing access configuration.

Processing logic generates, by the access configuration generator, an access configuration data store entry (or update) from the received data (processing block 404). The data defining one or more user data access requirements may be associated with an existing access configuration, in which case the data defining one or more user data access requirements edits/updates the existing access configuration. Alternatively, the data defining one or more user data access requirements may be associated with a new access configuration. The data defining one or more user data access requirements, whether for a new or updated access configuration, is then used to store an entry in an access configuration data store.

Processing logic then stores the entry in the access configuration data store for the one or more service(s) of the service provider system (processing block 406). In embodiments, the process 400 therefore provides an interface for users of a service provider system to define and have enforced access requirements for services.

Figure 4B:
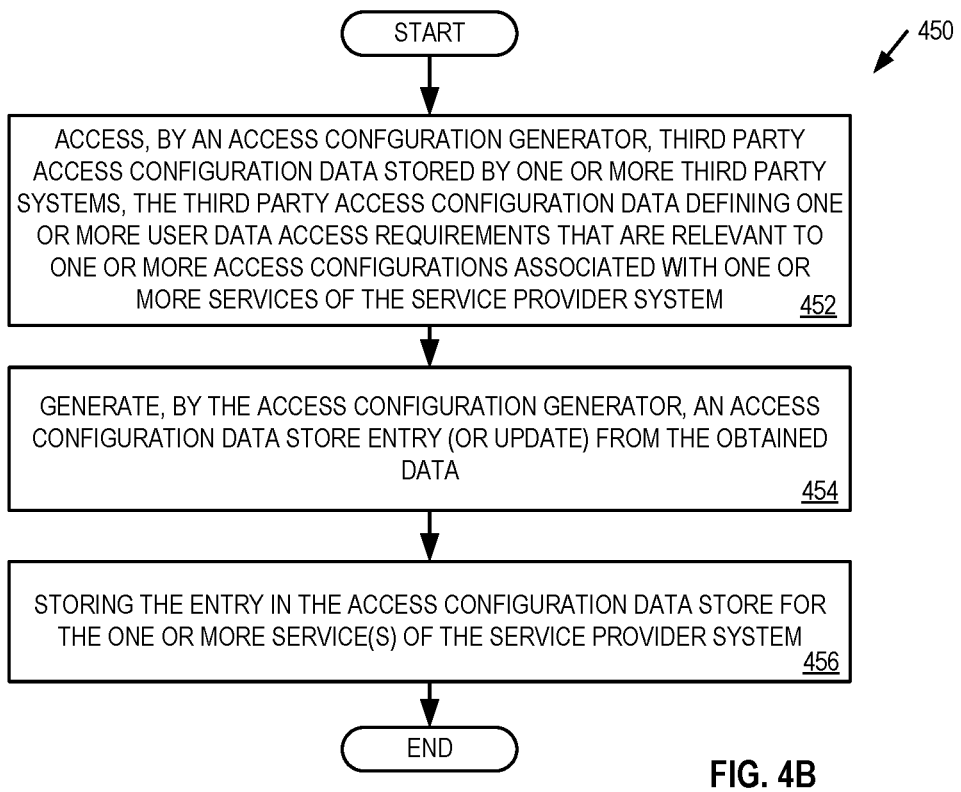
FIG. 4B is another embodiment of a process for creating access requirements for a service of a service provider system.

FIG. 4B is another embodiment of a process for creating access requirements for a service of a service provider system. The process 450 is performed by processing logic that may comprise hardware (circuitry, dedicated logic, etc.), software (such as is run on a general purpose computer system or a dedicated machine), firmware, or a combination. In one embodiment, the process 450 is performed a service provider system (e.g., service provider system 110 or 200).

Referring to FIG. 4B, processing logic begins by accessing, by an access configuration generator, third party access configuration data stored by one or more third party systems, the third party access configuration data defining one or more user data access requirements that are relevant to one or more access configurations associated with one or more services of the service provider system (processing block 452). As discussed herein, web pages, documents, etc. may be exposed by third party systems and contain relevant access restriction rules. Thus, processing logic may crawl or otherwise access this third party content to locate and extract such rules that the service and/or commerce platform seeks to follow. In embodiments, the extraction includes parsing the text of the third party content to detect rules, and then extracting the rule conditions from the text. The access may be periodic, such as daily, monthly, quarterly. The access may also be on demand, such as at the request of a user of the service provider system. Furthermore, similar to the discussion above in FIG. 4A, the access may be to generate new access configurations and their associated rules, or to edit/update existing rules and extracted rules.

Processing logic then generates, by the access configuration generator, an access configuration data store entry (or update) from the obtained data (processing block 454). In embodiments, processing logic uses the accessed content to locate keywords and then extract content associated with those keywords and providing the associated rules. Other data extraction techniques may also be used to extract the content providing the associated rules. The data extracted for the access requirements, whether for a new or updated access configuration, is then used to store an entry in an access configuration data store.

Processing logic then stores the entry in the access configuration data store for the one or more service(s) of the service provider system (processing block 456). In embodiments, the process 450 therefore provides an automatic technique to locate, define, and then have enforced access requirements for services.

Beneficially, these access requirements integrated into an enforcement mechanism in real time as they are created/edited to improve the deployment of such access restrictions. Furthermore, the access requirements need not be coded into each service, which improves the speed and efficiency of deployment. Furthermore, as discussed herein, by removing access enforcement from services, and instead using a central access configuration repository updatable in real time, the security and accuracy of service access enforcement is greatly improved.

Figure 5:
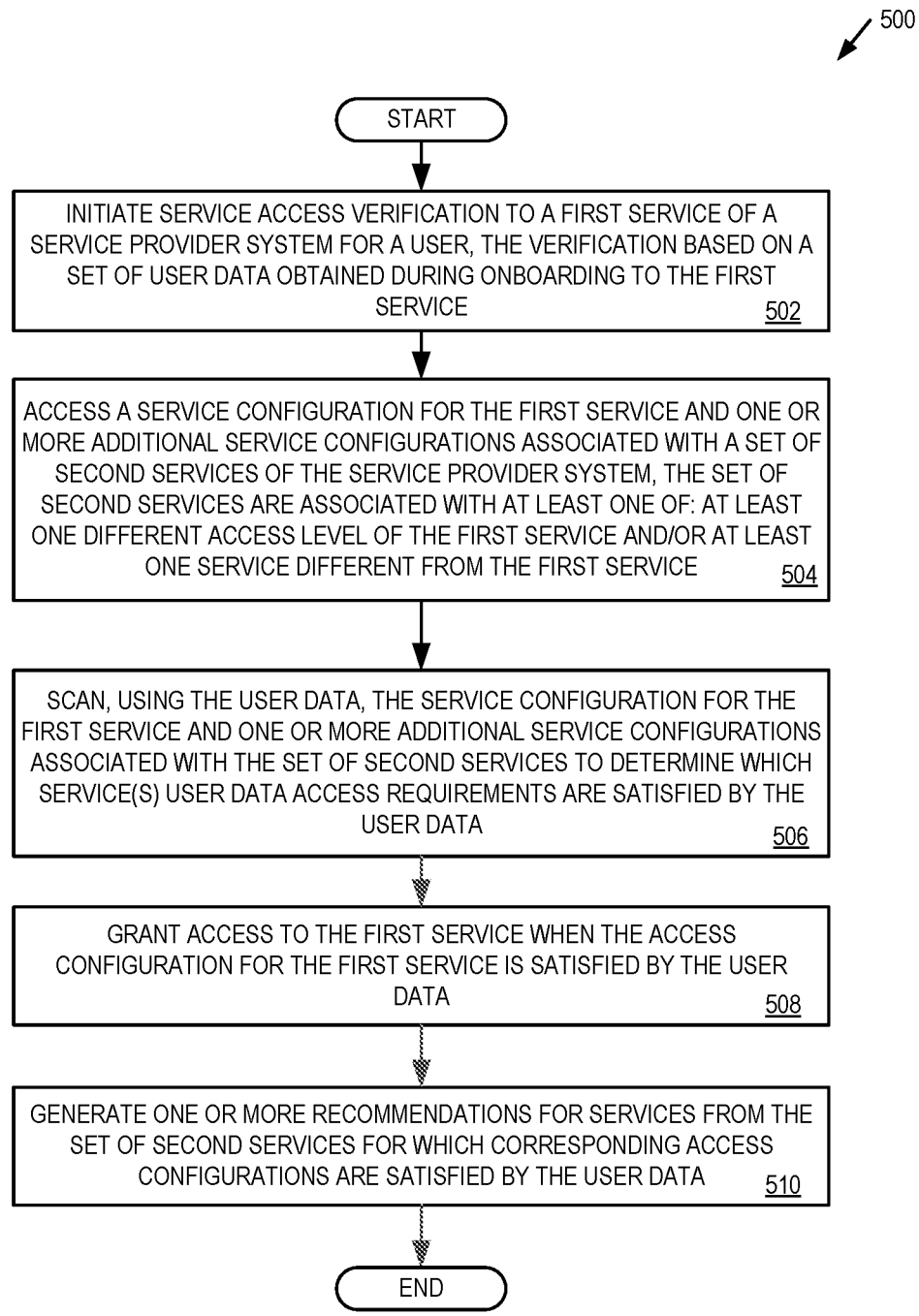
FIG. 5 is one embodiment of a process for granting access and generating recommendations for services of a service provider system.

FIG. 5 is one embodiment of a process for granting access and generating recommendations for services of a service provider system. The process 500 is performed by processing logic that may comprise hardware (circuitry, dedicated logic, etc.), software (such as is run on a general purpose computer system or a dedicated machine), firmware, or a combination. In one embodiment, the process 500 is performed a service provider system (e.g., service provider system 110 or 200), and provides additional details for the determination of whether access requirements are satisfied and subsequent determination and supply of service recommendations (e.g., FIG. 3).

Referring to FIG. 5, processing logic begins by initiating service access verification to a first service of a service provider system for a user, the verification based on a set of user data obtained during onboarding to the first service (processing block 502). The first service may be a service the user has requested access to.

Processing logic then accesses a service configuration for the first service and one or more additional service configurations associated with a set of second services of the service provider system, the set of second services are associated with at least one of: at least one different access level of the first service and/or at least one service different from the first service (processing block 504). As discussed herein, additional services that are related to, complimentary of, or otherwise defined, may be associated with a service. For example, sets of services may be determined and/or defined manually by a user of service provider system. As another example, the additional services may be determined automatically by clustering and/or determining service grouping according to the users of the service provider system and their associated service accesses. That is, it may be determined that a significant (e.g., a set percentage (e.g., a significance_number>X %) or threshold number (e.g., a total number, such as threshold_number>Y) of users typically seek access to services A, B, and C, whereas another significant group of users seek access to services D and E. These service groupings, whether defined manually or determined automatically from existing service provider system user data, form groups of related services {A, B, B', and C} an {D, E}. Then, if for example, the access verification of block 502 is for service B, then the group may be used to determine services A, B', and C are additional services which may be recommended to a user. Furthermore, the services may be different services (e.g., services A and C), different levels of the same service (e.g., B'), or any combination of services consistent with the discussion herein.

Processing logic scans, using the user data, the service configuration for the first service and one or more additional service configurations associated with the set of second services to determine which service(s) user data access requirements are satisfied by the user data (processing block 506). As discussed herein, user data captured during an onboarding process to the first service is compared to the user data access requirements (e.g., rules) defined by the service configurations.

Processing logic may then grant access to the first service when the access configuration for the first service is satisfied by the user data (processing block 508). Furthermore, processing logic may generate one or more recommendations for services from the set of second services for which corresponding access configurations are satisfied by the user data (processing block 510). Thus, in embodiments, the user may be granted access to the service to which the user initially sought access. Furthermore, the user may be recommended additional services that the user is likely to want access to. Additionally, even if the user is denied access to the service to which the user initially sought access, the user may still be determined to satisfy access requirements for additional services relevant to the user, a limited access version of the service to which the user failed to gain access, or a combination thereof. Thus, the user's access to the services of the service provider system is maximized to the extent possible based on the user's data.

FIG. 6 is one embodiment of a computer system that may be used to support the systems and operations discussed herein. For example, the computer system illustrated in FIG. 6 may be used by a user system, a service provider system, a service system providing one or more systems, or any combination of such systems. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

I claim:

1. A method for authenticating a user by a service provider system:
    receiving, from a service of the service provider system, a user data captured at an initiation of an onboarding process for a user seeking access to the service;
    retrieving, by a processing system of the service provider system, an access configuration associated with the service, the access configuration defining one or more user data access requirements to enable the user to access the service;
    determining, by the processing system of the service provider system, whether the one or more user data access requirements of the access configuration are satisfied by the user data;
    in response to determining that one or more user data access requirements are satisfied, enabling, by the processing system of the service provider system, the user to access the service of the server provider system;
    transmitting, by the processing system to the service, a notification indicating that the user has satisfied the access requirements to enable the user to continue the onboarding process for the user to access the service;
    determining, by the processing system of the service provider system, at least one additional service that the user is eligible to access based on the received user data and at least one additional access configurations associated with at least one additional service; and
    transmitting, by the processing system of the service provider system, a notification to the user indicating the at least one additional service that the user is eligible to access.

2. The method of claim 1, wherein the user data captured at the initiation of an onboarding process comprises a user location data associated with a physical location of the user, and wherein the one or more user data access requirements comprise an approved location where the service can be provided.

3. The method of claim 1, wherein the at least one additional service comprises a limited functioning version of the service to which the user is seeking access to, and wherein an additional access configuration associated with the limited functioning version of the service comprises a second set of one or more user data access requirements, different from the one or more user data access requirements.

4. The method of claim 1, wherein the at least one additional service comprises a different service that the user is not seeking access to, and wherein an additional access configuration associated with the different service comprises a third set of one or more user data access requirements, different from the one or more user data access requirements.

5. The method of claim 1, wherein determining, by the processing system of the service provider system, the at least one additional service comprises:
- accessing, by the processing system of the service provider system, a set of additional access configurations associated with a set of additional services of the service provider system;
- scanning, by the processing system of the service provider system, each additional access configuration from the set to determine whether the user can be provided access to a corresponding additional service based on a comparison of the received user data to a set of user data defined by said each additional access configuration; and
- determining the at least one additional service that the user is eligible to access from the set of additional services.

6. The method of claim 5, wherein the set of additional services of the service provider system comprises a subset of services of the service provider system predefined to be associated with the service to which the user is seeking to access.

7. The method of claim 5, wherein the set of additional services of the service provider system comprises a subset of services of the service provider system determined by the processing system of the service provider system based on a comparison of subsets of services to which users of the service provider system have access to, and to which the service belongs.

8. The method of claim 1, wherein the notification comprises a synchronous notification causing a service provider system user interface rendered by a user system to display data indicating the at least one additional service that the user is eligible to access.

9. The method of claim 1, wherein the notification comprises an asynchronous notification transmitted to a user system after the onboarding process is completed, and wherein the notification is comprised in an email message or a text message transmitted to the user system.

10. The method of claim 1, wherein when the one or more user data access requirements are determined not to be satisfied, the method further comprises:
- denying, by the processing system of the service provider system, the user access to the service of the server provider system; and
- initiating the determining, by the processing system of the service provider system, the at least one additional service in response to the denying.

11. The method of claim 1, further comprising:
- receiving, at a user interface of an access configuration generator from a service provider system user, data defining the one or more user data access requirements to enable users to access the service;
- generating, by the access configuration generator, an access configuration data store entry from the received data defining the one or more user data access requirements; and
- storing, by the access configuration generator in the access configuration data store, the entry.

12. The method of claim 1, further comprising:
- accessing, by an access configuration generator, third party access configuration data stored by one or more third party systems, the third party access configuration data defining the one or more user data access requirements that are relevant to the service;
- generating, by the access configuration generator, an access configuration data store entry from the accessed third party access configuration data; and
- storing, by the access configuration generator in the access configuration data store, the entry.

13. A non-transitory computer readable storage medium including instructions that, when executed by a processor, cause the processor to perform operations for a for authenticating a user by a service provider system:
- receiving, from a service of the service provider system, a user data captured at an initiation of an onboarding process for a user seeking access to the service;
- retrieving, by a processing system of the service provider system, an access configuration associated with the service, the access configuration defining one or more user data access requirements to enable the user to access the service;
- determining, by the processing system of the service provider system, whether the one or more user data access requirements of the access configuration are satisfied by the user data;
- in response to determining that one or more user data access requirements are satisfied, enabling, by the processing system of the service provider system, the user to access the service of the server provider system;
- transmitting, by the processing system to the service, a notification indicating that the user has satisfied the access requirements to enable the user to continue the onboarding process for the user to access the service;
- determining, by the processing system of the service provider system, at least one additional service that the user is eligible to access based on the received user data and at least one additional access configurations associated with at least one additional service; and
- transmitting, by the processing system of the service provider system, a notification to the user indicating the at least one additional service that the user is eligible to access.

14. The non-transitory computer readable storage medium of claim 13, wherein the user data captured at the initiation of an onboarding process comprises a user location data associated with a physical location of the user, and wherein the one or more user data access requirements comprise an approved location where the service can be provided.

15. The non-transitory computer readable storage medium of claim 13, wherein determining, by the processing system of the service provider system, the at least one additional service comprises:
- accessing, by the processing system of the service provider system, a set of additional access configurations associated with a set of additional services of the service provider system;
- scanning, by the processing system of the service provider system, each additional access configuration from the set to determine whether the user can be provided access to a corresponding additional service based on a comparison of the received user data to a set of user data defined by said each additional access configuration; and
- determining the at least one additional service that the user is eligible to access from the set of additional services.

16. A service provider system, comprising:
a memory; and
a processor, coupled with the memory, configured to:
  receive, from a service of the service provider system, a user data captured at an initiation of an onboarding process for a user seeking access to the service,
  retrieve an access configuration associated with the service, the access configuration defining one or more user data access requirements to enable the user to access the service,
  determine whether the one or more user data access requirements of the access configuration are satisfied by the user data,
  in response to determining that one or more user data access requirements are satisfied, enable the user to access the service of the server provider system,
  transmit, to the service, a notification indicating that the user has satisfied the access requirements to enable the user to continue the onboarding process for the user to access the service,
  determine at least one additional service that the user is eligible to access based on the received user data and at least one additional access configurations associated with at least one additional service, and
  transmit a notification to the user indicating the at least one additional service that the user is eligible to access.

17. The service provider system of claim 16, wherein the user data captured at the initiation of an onboarding process comprises a user location data associated with a physical location of the user, and wherein the one or more user data access requirements comprise an approved location where the service can be provided.

* * * * *